United States Patent [19]
Jacquin et al.

[11] 4,352,729
[45] Oct. 5, 1982

[54] PROCESS FOR HYDROTREATING HEAVY HYDROCARBONS IN THE PRESENCE OF A MOLYBDENUM CONTAINING CATALYST

[75] Inventors: Yves Jacquin, Sevres; Dai-Nghia Huynh, Rueil-Malmaison; Maurice Born, Nanterre, all of France

[73] Assignee: Institut Francais du Petrole, Rueil-Malmaison, France

[21] Appl. No.: 222,228

[22] Filed: Jan. 5, 1981

[30] Foreign Application Priority Data

Jan. 4, 1980 [FR] France ............................. 80 00178

[51] Int. Cl.$^3$ ................... C10G 45/04; C10G 45/08; B01J 23/28; B01J 23/88
[52] U.S. Cl. ........................ 208/209; 208/216 R; 208/217; 208/251 H; 208/264; 252/466; 252/467; 252/470
[58] Field of Search ............... 208/216 R, 251 H, 209

[56] References Cited

U.S. PATENT DOCUMENTS

| | | | |
|---|---|---|---|
| 3,010,902 | 11/1961 | Spengler et al. | 252/46.4 |
| 3,161,585 | 12/1964 | Gleim et al. | 208/209 |
| 3,169,919 | 2/1965 | Gatsis et al. | 208/264 |
| 3,231,488 | 1/1966 | Gatsis et al. | 208/251 H |

Primary Examiner—Delbert E. Gantz
Assistant Examiner—O. Chaudhuri
Attorney, Agent, or Firm—Millen & White

[57] ABSTRACT

Process for hydrogenating a heavy hydrocarbon charge containing asphaltenes, in the liquid phase, in the presence, as catalyst, of a molybdenum blue solution in a polar organic solvent soluble in the charge, so as to remove impurities therefrom before subjecting it to further refining.

10 Claims, No Drawings

PROCESS FOR HYDROTREATING HEAVY HYDROCARBONS IN THE PRESENCE OF A MOLYBDENUM CONTAINING CATALYST

BACKGROUND OF THE INVENTION

This invention concerns the field of petroleum refining and, more specifically, processes for converting by hydrogenation heavy crude oils, heavy hydrocarbon cuts and petroleum residues.

The feed charge used in the process of this invention may consist of any heavy hydrocabon oil of high boiling point, for example an oil of which at least 80% by weight of the components have a boiling point above 350° C. The initial oil source may be any hydrocarbon deposit of old origin including, besides crude oil, such materials as shale oil or oil extracted from oily sands, or liquid hydrocarbons obtained by liquefying coal or any hydrocarbon mixture containing undesirable compounds.

The crude oil and the petroleum cuts are very complex mixtures where, in addition to the hydrocarbons, are present various undesirable compounds containing sulfur, nitrogen, oxygen and/or metals. The amount and the nature of the compounds vary in accordance with the origin of the crude oil and the considered cuts. Generally these impurities are detrimental to a good quality of the petroleum products in view of their pollution or corrosion effect, of their odor and/or unstability, or because they make very difficult the refining operations and, particularly, the conversion to light products, since they may deactivate the catalysts used in these conversions such as, for example, the catalytic cracking or hydrocracking catalysts.

The treatment of these charges is made difficult by the presence of asphaltenes and of metals which, under insufficiently controlled conditions, result in the deactivation of the catalysts.

The contaminating metal agents may be present as oxides or sulfides, but usually they consist of organometallic compounds such as porphyrines and their derivatives which are associated to the asphaltenes and to the resins, the most common metals being vanadium and nickel.

The asphaltenes are essentially in the form of a colloidal suspension which, under the hydrorefining conditions, may agglomerate and form a deposit on the catalyst composition. Consequently, the fixed-bed hydrotreatment of these charges does not produce satisfactory results inasmuch as the catalyst deactivates as a result of coke and metal deposition.

A technique for obviating these deficiencies, by providing a better access of high molecular weight asphaltenes to the catalyst sites, is disclosed in several patents, for example the French Pat. No. 1 373 253 or the U.S. Pat. No. 3,165,463.

For this purpose, there are used catalytically active metal compounds, in extremely divided particles, used as a colloidal suspension or dissolved in a solvent. When they are introduced into the charge, they are converted to sulfides and, in the course of the hydrorefining treatment, there is formed a sludge containing the catalyst, asphaltenes and various metal impurities.

It is known to make use as catalytic active agent of a compound of a metal selected from groups II to VIII and, more particularly, from groups IV, V and VI and the iron group. Among the metals of these latter groups, molybdenum is particularly to be mentioned, either alone or in joint use with a metal of the iron group, for example as ammonium heptamolybdate, phosphomolybdic acid, a molybdenum organic salt or molybdenum blue.

DETAILED DISCUSSION

The present invention relates to a process for hydrotreating heavy hydrocarbons, in the liquid phase, in the presence of a dispersed catalyst. More particularly, it concerns a hydroconversion process wherein a liquid phase of hydrocarbon oil containing in a dispersed state a particular molybdenum blue catalyst, is reacted with hydrogen. This treatment is conducted with the purpose of removing sulfur, nitrogen, metals (particularly Ni, V, Na, Fe, Cu), asphaltenes and resins contained in the charge, these removals resulting in a simultaneous reduction of the Conradson carbon.

The U.S. Pat. No. 3,169,919 discloses a hydroconversion process wherein a hydrocarbon charge is contacted with colloidal molybdenum blue, prepared, for example, according to the method described in Journal of the American Chemical Society, Vol. 64, page 2543-2545 (1945). The molybdenum blue prepared according to this method is extracted by means of a solvent such as an alcohol. The resulting solution is admixed with the hydrocarbon charge to be refined, the solvent is expelled so that the molybdenum compound appears in a colloidal form and it is only at this stage that the hydrorefining step is performed.

It has now been found that a hydroconversion process making use of a molybdenum blue catalyst soluble in hydrocarbons, prepared according to a specific method, offers advantages which will be made apparent hereinafter.

There is used, according to the invention, as hydrorefining catalyst, a molybdenum blue solution in a polar organic solvent, preferably a solvent whose normal boiling point is relatively high, higher than 140° C. This feature distinguishes the present process from that of U.S. Pat. No. 3,169,919 according to which the alcohol was expelled to form a colloidal precipitate of molybdic complex, before the performance of the hydrorefining step.

This solution may be obtained by extracting the molybdenum blue from the aqueous solution where it has been formed, by means of a polar solvent not entirely miscible with water, for example a solvent whose solubility in water at 20° C. is less than 10% by weight. It is also possible to operate with a fresh precipitate of molybdenum blue and to extract the latter with a polar solvent, as described in U.S. Pat. No. 3,169,919.

The molybdenum blue solution in a polar organic solvent, such as defined hereinafter, then forms a solution miscible with the hydrocarbon to be treated. Thus, when admixed with a heavy gas oil or a fuel oil, in a proportion of, for example, 5% of molybdenum in the mixture, it may be filtered without forming on the filter more deposits than those observed with the hydrocarbon fraction to be treated without the addition of molybdenum blue solution.

This feature distinguishes the present process from that of U.S. Pat. No. 3,169,919 which makes use of a colloidal precipitate and forms deposits in the filtration step.

By polar organic solvent, it is meant a compound whose molecule contains carbon, at least one heteroatom selected preferably from O, S, N, P and optionally also hydrogen. It is soluble in a proportion of at least 1% in the hydrocarbons under the conditions of the hydrorefining reaction.

By way of example, and provided that the above-mentioned partial immiscibility condition is fulfilled, there can be mentioned, as convenient solvents, alcohols, ethers, ketones, esters, phosphoric esters and amides, sulfuric esters, amides and nitriles.

However, the solvents containing only oxygen as heteroatom are preferred, in order to avoid the supply of elements similar to those which are to be removed.

Preference is given to alcohols having from 4 to 20 carbon atoms in the molecule, particularly 6 to 18 carbon atoms, such, for example, as isobutanol, isopentanol, $C_8$–$C_{12}$ OXO alcohols, cyclohexanol or benzyl alcohol. The alcohols boiling above 150° C. are preferred.

It is obviously desirable that at least one portion of the alcohol be kept in the liquid phase under the hydrorefining conditions. However this is not obligatory and the mere introduction of molybdenum blue into the hydrocarbon charge as a solution in a polar solvent boiling above 140° C., is sufficient for obtaining improved results.

It is assumed that the heavy solvent stabilizes the molybdenum blue solution up to a temperature which enables the stabilization of the blue by the hydrocarbon charge itself, particularly by the asphaltene/resin fractions of said charge. This stabilization is maintained even when, during heating, the solvent partly or totaly vaporizes.

The concentration of the molybdenum blue solution in the polar solvent may be selected within a wide range, for example from 0.1 to 50%, preferably from 5 to 40% by weight, calculated as molybdenum.

The molybdenum blue in aqueous solution may be formed by mere reduction of an aqueous solution of molybdic acid or of an alkali metal molybdate. The operation is preferably conducted in acidic medium, for example in the presence of sulfuric acid or phosphoric acid. Hydrochloric acid is usually less desirable, since it leads to a partial precipitation of molybdenum. Any reducing agent may be used, such for example as nascent hydrogen, $H_2S$, $SO_2$, a redox system such as $SnCl_2$, a molybdenum salt of lower valency or, preferably, hydrazine. An electrolytic reduction may also be used.

The pH is advantageously lower than or equal to 4.

An excess of strong acid such as sulfuric acid usually facilitates the passage of the molybdenum blue from the aqueous solution to the organic solution. The pH is then preferably at most equal to 2.

The molybdenum blues are compounds whose structure is not well defined. According to certain authors, they consist of molybdenum oxides having an apparent valency lower than 6 and higher than 3.

The starting molybdate solution may contain other salts, preferably phosphates, as described for example in the French Pat. No. 1 099 953; it is also possible to start with an heteromolybdate, such for example as a phosphomolybdate. The molybdenum blue may then contain heteroatoms, for example phosphorus. The invention is however not limited to the use of a particular molybdenum blue.

The operation according to the French Pat. No. 1 099 953 consists of reducing an acidified aqueous solution of alkali metal heptamolybdate, then extracting it with isobutyl alcohol or with an ether, adding to the resulting isobutyl alcohol or ether solution a higher alcohol having preferably from 6 to 12 carbon atoms, removing the isobutyl alcohol or the ether by evaporation and partially removing the higher alcohol by vacuum distillation up to a concentration of the resulting molybdenum complex from 15 to 40% (as molybdenum). The solvent must not be completely removed since otherwise the complex would no longer be soluble in the hydrocarbons. The higher alcohol is preferably an OXO alcohol or a mixture of OXO alcohols or an Alfol.

It is particularly advantageous to add at least one compound of the iron group, preferably as a compound soluble in organic medium, to the molybdenum blue catalyst solution obtained according to the described method. This compound may be selected, for example, from metal salts of organic acids as well as from metal complexes whose ligand is an oxygen-, nitrogen-, sulfur- or chlorine-containing organic compound. The preferred soluble compounds are oleates, stearates, octoates, naphthenates, acetylacetonates or ethylhexanoates. The preferred metals from the iron group are cobalt and nickel.

The hydrotreatment reaction is usually conducted at a temperature from 250° to 450° C. and a pressure from 50 to 200 bars. In case of continuous operation, the feed rate of the hydrocarbon charge is usually from 0.1 to 10 volumes per volume of reaction space and per hour. The hydrogen flow rate is, for example, from 50 to 5000 liters per liter of hydrocarbon liquid charge.

The catalyst according to the invention is used in a proportion of, for example, from 0.001 to 5% by weight, calculated as molybdenum, with respect to the hydrocarbon charge.

When a metal from the iron group is present, the atomic ratio of this metal to molybdenum is, for example, from 0.1:1 to 10:1.

The process of the invention may be conducted in any convenient manner, for example, as a continuous process or batchwise.

The fresh catalyst is introduced into the fresh hydrocarbon charge as a solution in a polar solvent.

When the soluble compounds are added to the hydrocarbon charge, they first dissolve therein and, subsequently, maintain their catalytic activity even when converted, after a certain time under the hydroconversion conditions, to metal compounds dispersed in the treated hydrocarbon.

The continuous performance of the process requires that the heavy hydrocarbons and the catalyst sludge be separated from the total product discharged from the reaction zone. This operation is conducted by any convenient means, for example by distillation, decantation, centrifugation, hydrocycloning or by any other means known in the art. It is particularly advantageous to separate the sludge by adding a diluent to the mixture, which makes the separation easier. For this purpose, there can be used a hydrocarbon or a hydrocarbon oil distillation cut. Preferably, there is used an aromatic fraction or a fraction containing a high proportion of aromatic compounds such as benzene, toluene, polyalkylaromatic hydrocarbons or mixtures of aromatic compounds or even petroleum cuts having a high content of aromatic compounds, such as light recycle oils from catalytic cracking (light cycle oil), aromatic extracts from oil manufacture or heavy gas oils from steam-cracking.

After separation, the sludge may be washed with a solvent, preferably an aromatic solvent selected from the above-mentioned list of solvents. Then, the sludge may be recycled, preferably after washing, so as to be combined with a new hydrocarbon charge. Periodically or continuously, there is withdrawn a portion of said sludge, as catalyst purge and it is replaced by a substantially equivalent amount of fresh catalyst components, so that the metal catalyst content of the treated charge be, for example, from 0.01 to 5% by weight. As a matter of fact, during the treatment, the organo-metallic compounds which provide for the solubilization of the metals in the hydrocarbon phase are partially destroyed. The metals contained therein accumulate in the catalyst-containing sludge. This nickel and vanadium accumulation in the catalyst-containing sludge contributes to the slow deactivation of the latter and makes desirable the purge of a portion of the catalyst and its replacement by an equivalent amount of fresh catalyst.

The sludge containing the catalyst and the deposited metals, mainly nickel and vanadium, is fed to a treatment system operated according to techniques known in the art, whereby nickel, vanadium, molybdenum and optionally cobalt may be recovered. A portion of these metals may be reshaped to manufacture catalyst according to the invention by making use of suitable transformation systems.

The following examples are given for illustrative purpose and cannot be considered as limiting in any manner the scope of the invention.

EXAMPLE 1

Test No. 1

55.8 g of pure ammonium paramolybdate and 1350 cc of distilled water are introduced into a glass Grignard reactor of 2 liters capacity, heated by means of an electric flask heater and equipped with a stirrer of the propeller type, a condenser and a thermometer. The mixture is stirred up to complete dissolution of the molybdenum salt and then 407 g of $H_2SO_4$ at a 98% by weight concentration are slowly added.

There is subsequently added, while stirring, 63 g of $HNa_2PO_4.12H_2O$. The reactor content is then brought to boiling and 48 cc of an aqueous solution of hydrazine hydrochloride at a 6% by weight concentration are then added.

The aqueous solution of molybdenum blue thus obtained is divided into 3 equal portions.

The first aqueous portion is extracted with 600 cc of isobutyl alcohol; the solution is settled so as to recover the supernatent alcohol phase, and this alcoholic phase of molybdenum blue is used again to extract the second and then the third aqueous fraction.

After extraction, the alcoholic phase is dried with anhydrous $Na_2SO_4$ and then filtered. 200 ml of $C_{10}$ OXO alcohol is then added to the filtered solution and isobutyl alcohol and a portion of the OXO alcohol are removed in a revolving evaporator, at 100° C., under a vacuum of about 1 mmHg. There is thus obtained 88.5 g of a molybdenum blue solution soluble in any proportion in most of the hydrocarbons, including crude oils or reduced crude oils.

The molybdenum content of this alcoholic solution is 24.75% by weight.

The resulting catalyst will be designated as catalyst A.

The stability of the hydrocarbon solutions of catalyst A is shown by the following tests:
(a) catalyst A obtained in test No. 1 is placed in a bubbling flask and diluted with heptane (90% by volume of heptane, 10% of catalyst A). During 1 hour at 20° C., 30 liters/hour of a mixture containing 15% by volume of hydrogen sulfide and 95% of hydrogen, is caused to bubble. At the end of this treatment, the liquid remains blue and no precipitate is formed.
(b) the solution of catalyst A, in a proportion corresponding to 2 g of molybdenum, is diluted into 200 g of a reduced crude oil charge from Kuwait (Table II) and the mixture is heated up to 360° C. in the presence of hydrogen. It is observed that the solution remains substantially homogeneous (in contrast with the case where the solvent is isopentyl alcohol). Then, if the asphaltenes are separated by heptane precipitation (standard NF T 07025), it is observed that the major part of molybdenum is to be found in the asphaltene phase.

Test No. 2

Test No. 1 is repeated except that 34.9 g of cobalt octoate solution in toluene are added to the alcoholic solution. After stirring, there is obtained an homogeneous solution whose molybdenum contents is 17.7% and cobalt content 3.11%. The resulting solution is called catalyst B.

Test No. 3

Test No. 2 is repeated except that nickel octoate is added, instead of cobalt octoate. The resulting solution contains 17.7% of molybdenum and 3.10% of nickel; it is called catalyst C.

Test No. 4

The operation is conducted as in test No. 1, except that 18.8 g of cobalt nitrate hydrate are added to the 55.8 g of ammonium paramolybdate. The two salts are finely crushed before the addition of 1350 cc of distilled water heated to 60° C. The mixture is vigorously stirred up to complete dissolution and then the operation is conducted as in test No. 1. There is thus obtained 95 g of a blue alcoholic solution having a 22.4% molybdenum content and a 4% cobalt content. It is called catalyst D.

Table I below summarizes the characteristics of the prepared molybdenum blues.

TABLE I

| COMPOSITION | CATALYST | | | |
| --- | --- | --- | --- | --- |
|  | A | B | C | D |
| Mo | 25 | 17.7 | 17.7 | 22.4 |
| Co | 0 | 3.11 | 0 | 4 |
| Ni | 0 | 0 | 3.10 | 0 |

EXAMPLE 2

A series of tests of the catalytic properties of the obtained solutions is conducted. The characteristics of the charge are reported in Table II.

TABLE II

ORIGIN:
reduced Kuwait crude oil, fraction boiling above 350° C.,
specific gravity (g/cc at 15° C.) = 0.969
sulfur content g/100 g = 4
total nitrogen content in ppm by weight = 2100
metal content (Ni + V) in ppm by weight = 65
asphaltene content, % by weight = 2.78
S content of the asphaltenes = 7.8%
Conradson carbon = 9.5
resin content/isopropanol = 10.6

TABLE II-continued sulfur content of the resins = 10.6%

In the catalytic tests, sulfur is determined by a combustion method with an induction oven according to standard NF 07 025. Nitrogen is determined by the Kjeldahl method. The asphaltene content is determined according to standard NFT 60–115 (Asphaltenes to normal heptane). Nickel and vanadium are determined after mineralization and dissolution in aqueous phase, by the atomic absorption technique. The "resins/isopropanol" content is determined on the maltenes obtained by deasphalting with n-heptane, by reproducing the analysis method standard NF T 07025 with isopropanol as precipitation solvent.

DESCRIPTION OF THE APPARATUS

The catalytic tests are conducted in a 500 cc autoclave provided with external stirring means operated by rocking. The autoclave is connected to a pressurized hydrogen source. A special device makes it possible to withdraw 10 g samples for analysis during the test. The autoclave is provided with a regulated electric heating system; the temperature indicated in the description of the tests is that of the liquid medium during the experiment.

OPERATING CONDITIONS OF A TEST

A known weight of catalyst (as solution in a polar solvent) is added to 200 g of hydrocarbon subjected to the treatment. The reactor is closed and a test at a pressure of 100 kg/cm$^2$ is performed with cold hydrogen. The hydrogen is then purged and fresh hydrogen is fed at a pressure of 30 kg/cm$^2$. The temperature programmation and stirring are then started. After a period of 2 h 30, the reactor temperature attains the value preselected for the test. The pressure is then adjusted to the desired value by addition of fresh hydrogen and this instant is taken as initial time (zero time).

Before analysis thereof, the resulting products are centrifuged for separating solid deposits therefrom.

To 200 g of Kuwait reduced crude oil (see Table II) there is added a catalyst amount corresponding to 2 g of molybdenum. The tests are conducted according to the above-described operating conditions.

The results and the operating conditions are reported again in Table III.

TABLE III

CHARGE: Kuwait reduced crude oil 200 g
Catalyst amount corresponding to 2 g of molybdenum
Pressure: 90 kg/cm$^2$ Temperature: 370° C.
Stirring: 200 oscillations per minute
Test duration: 6 hours at a temperature of 370° C.

| CATA-LYSTS | S CONTENT % by weight | ASPHALTENES CONTENT % by weight | RESIN CONTENT % by weight | Ni ppm | V ppm |
|---|---|---|---|---|---|
| A | 2.77 | 0.8 | 3.6 | 5 | 4 |
| B | 2.08 | 0.69 | 3.24 | 2 | 1 |
| C | 2.08 | 1 | 2.6 | 8 | 2 |
| D | 2.12 | 0.72 | 3.3 | 3 | 2 |

It is observed that the 4 tested catalysts are active. Catalysts B and D, which correspond to two different ways of introducing the elements of group 8, have similar activities. The catalysts B and D are more active than the catalyst based on molybdenum alone. The catalyst C wherein nickel has been introduced, is active for sulfur removal to the same extent as B and D, less active for the hydrodestruction of asphaltenes but more active for removing the sulfur contained in the asphaltenes and resins which remain in solution after the reaction. Finally, all the catalysts A, B, C and D are very active for hydrodemetallization.

EXAMPLE 3

When using the same charge as in example 2 and catalyst B in the same operating conditions except the reaction temperature which is 390° C. and then 410° C., instead of 370° C., the following results, reported in Table IV, are obtained:

TABLE IV

| CATALYST | S CONTENT % by weight | ASPHALTENES CONTENT % by weight | RESINS CONTENT % by weight | TEMPERATURE °C. |
|---|---|---|---|---|
| B 1% Mo with respect to the charge | 2.08 | 0.69 | 3.24 | 370 |
| | 1.46 | 0.43 | 1.40 | 390 |
| | 0.8 | 0.25 | 0.55 | 410 |

It is clear that the temperature increase improves the catalyst performance.

EXAMPLE 4

The operating conditions are the same as in Example 2 except with respect to the catalyst whose amount is varied. The obtained results are reported in Table V.

It is observed that all the results are satisfactory. The best results, as far as the main reactions of desulfurization and asphaltenes removal are concerned, are obtained with a catalyst content from 1 to 0.2% by weight.

TABLE V

| CATALYST | % of Mo INTRODUCED IN THE TEST, by weight | ANALYSIS OF THE HYDROCARBONS AFTER THE TEST | | | | |
| | | SULFUR CONTENT % by weight | ASPHALTENES CONTENT % by weight | RESINS CONTENT % by weight | Ni ppm | V ppm |
|---|---|---|---|---|---|---|
| B | 2% | 2.5 | 2.5 | 0.08 | 2 | 1.5 |
| | 1% | 2.08 | 0.69 | 3.24 | 2 | 1 |

TABLE V-continued

| CATA-LYST | % of Mo INTRODUCED IN THE TEST, by weight | ANALYSIS OF THE HYDROCARBONS AFTER THE TEST ||||| 
| | | SULFUR CONTENT % by weight | ASPHALTENES CONTENT % by weight | RESINS CONTENT % by weight | Ni ppm | V ppm |
| --- | --- | --- | --- | --- | --- | --- |
| | 0.5% | 1.96 | 0.71 | 6.18 | 3 | 1.5 |
| | 0.2% | 2.27 | 1.4 | 4.46 | 3.5 | 1.5 |

EXAMPLE 5

Example 2 is repeated with the use as catalyst of a molybdenum blue solution of type B of example 1 in various solvents at the same concentrations as in example 1.

The following Table VI reports the results obtained.

TABLE VI

| SOLVENT | SULFUR CONTENT % by weight | ASPHAL-TENES CONTENT % by weight | Ni ppm | V ppm |
| --- | --- | --- | --- | --- |
| Ethyl sulfate | 2.25 | 0.72 | 4 | 3 |
| Tricresylphosphate | 2.19 | 0.85 | 3 | 2 |
| Benzophenone | 2.15 | 0.91 | 5 | 2 |
| Ethyl oleate | 2.22 | 0.88 | 4 | 2 |
| Anisole | 2.30 | 0.74 | 5 | 12 |

EXAMPLE 6

Example 2 is repeated with the use as catalyst of a molybdenum blue solution prepared as in test No. 1 of example 1, except that sodium phosphate is not used.

It has been found that the resulting product contains 2.83% by weight of sulfur, 1.1% by weight of asphaltenes and has a total metal content (Ni+V) of 11 ppm by weight.

EXAMPLE 7

(comparison)

Test No. 1 of example 1 is repeated except that the addition of $C_{10}$ OXO alcohol is omitted: the molybdenum blue solution in isobutyl alcohol has been directly used as catalyst in example 2, except that all the alcohol has been evaporated before performing the hydrotreatment, so as to give a colloidal form to molybdenum. The molybdenum weight (2 g) was unchanged.

The following results were obtained:

| | |
| --- | --- |
| Sulfur: | 3.1% by weight |
| Asphaltenes: | 1.3% by weight |
| V + Ni: | 13 ppm by weight |

EXAMPLE 8

(comparison)

A test has been conducted in the same conditions as in example 2 with the use of molybdenum naphthenate of the trade, containing 6.4% of molybdenum.

The molybdenum content (2 g) is the same as precedingly.

The following results were obtained (by weight):

| | |
| --- | --- |
| Asphaltenes content: | 1.38% |
| Resins content: | 6% |
| Sulfur content: | 2.7% |
| Ni + vanadium: | 20 ppm |

The comparison with the examplified catalysts prepared according to the invention shows that molybdenum naphthenate is less active.

EXAMPLE 9

In order to make apparent the performances of the catalyst for demetallization, a test has been performed with an equipment for continuous operation. The charge is a mixture containing 50% by weight of atmospheric gas oil and 50% by weight of 350° C+ vacuum residue of Cabimas. The characteristics of the mixture are as follows:

| | |
| --- | --- |
| Asphaltenes: | 7.25% by weight |
| Resins: | 13% by weight |
| Ni: | 36 ppm |
| V: | 450 ppm |
| Sulfur: | 2.1% by weight |

Catalyst B of example 1 is introduced into this hydrocarbon mixture in such an amount as to obtain a 0.2% content by weight of molybdenum in the mixture. This mixture is introduced into the reactor at a VVH of 0.2 volume of mixture per volume of reactor and per hour. The temperature is 400° C., the pressure 100 bars and the hydrogen flow rate 180 liters of hydrogen measured under normal conditions, per liter of hydrocarbon in the same conditions.

The results are reported in Table VII.

TABLE VII

| CHARACTERISTICS OF THE PRODUCT (after centrifugation) -by weight- | | | CONVERSION RATE IN PROPORTION OF THE CHARGE IN % |
| --- | --- | --- | --- |
| Asphaltenes | % | 3.78 | 47.8 |
| Resins | % | 6.71 | 48.4 |
| Sulfur | % | 1.60 | 23.8 |
| Ni | ppm | 18 | 50.0 |
| V | ppm | 150 | 66.7 |

What is claimed is:

1. In a process for the treatment with hydrogen of an asphaltene containing charge of heavy hydrocarbons, wherein the charge is contacted with a catalyst containing molybdenum, under hydrotreatment conditions, the improvement comprising effecting the process by introducing into the heavy hydrocarbons charge a molybdenum blue solution in a polar organic solvent, said solvent having a normal boiling point higher than 140° C. and being soluble in said hydrocarbon charge, and then treating the so-modified hydrocarbon charge under said hydrotreatment conditions.

2. A process according to claim 1, wherein the polar solvent is selected from alcohols, ethers, ketones, esters, phosphoric esters, phosphoric amides, sulfuric esters, amides and nitriles.

3. A process according to claim 1, wherein the concentration of the solution is from 5 to 40% by weight, calculated as molybdenum.

4. A process according to claim 1, wherein at least a portion of the polar solvent is maintained in the liquid phase during the hydrotreatment.

5. A process according to claim 1, wherein the polar organic solvent is an alcohol having from 6 to 18 carbon atoms per molecule.

6. A process according to claim 1, wherein the molybdenum blue solution is prepared by reducing an acidified aqueous solution of an alkali metal molybdate or heteromolybdate and extracting the resultant solution of molybdenum blue, under acid pH conditions, with said polar organic solvent, said solvent being not entirely miscible with water.

7. A process according to claim 6, wherein the reduction is performed using an aqueous solution containing both an alkali metal molybdate and an alkali metal phosphate.

8. A process according to claim 6, wherein the reduction is performed by means of hydrazine.

9. A process according to claim 6, wherein the pH of the molybdenum blue aqueous solution, during the extraction, is at most equal to 2.

10. A process according to claim 1, performed in the presence of an additional nickel or cobalt compound.

* * * * *